United States Patent [19]

Yu

[11] 4,390,364
[45] Jun. 28, 1983

[54] REMOVAL OF FINE PARTICLES FROM MOLTEN METAL

[75] Inventor: Ho Yu, Murrysville, Pa.

[73] Assignee: Aluminum Company of America, Pittsburgh, Pa.

[21] Appl. No.: 289,749

[22] Filed: Aug. 3, 1981

[51] Int. Cl.³ .................... C22B 21/06; C22B 26/22
[52] U.S. Cl. .......................... 75/67 A; 75/68 R; 75/93 AB; 75/93 AC; 75/93 E
[58] Field of Search ............... 75/68 R, 67 A, 93 AB, 75/93 AC, 93 E

[56] References Cited

U.S. PATENT DOCUMENTS

| | | | |
|---|---|---|---|
| 2,840,463 | 6/1958 | Stroup et al. | 75/68 |
| 3,039,864 | 6/1962 | Hess et al. | 75/67 |
| 3,737,303 | 6/1973 | Blayden et al. | 75/68 |
| 3,737,304 | 6/1973 | Blayden et al. | 75/68 |
| 3,737,305 | 6/1973 | Blayden et al. | 75/68 |
| 4,067,731 | 1/1977 | Chia | 75/68 R |
| 4,277,280 | 7/1981 | Montgrain | 75/68 R |
| 4,290,588 | 9/1981 | Pelton | 75/68 R |

OTHER PUBLICATIONS

*Process Design Manual for Suspended Solids Removal*, for Environmental Protection Agency Technology Transfer, by Burns and Roe, Inc., Program No. 17030 GNO, Contract No. 14-12-930, Oct. 1971, Chapter 7.

Primary Examiner—M. J. Andrews
Attorney, Agent, or Firm—Carl R. Lippert

[57] ABSTRACT

Molten metal such as the light metals aluminum and magnesium containing finely divided suspended particles is treated to remove such particles and beneficiate the metal. The particles are typically in the micron size range and may include solid material such as oxides or solid salt particles and may include buoyant liquid particles such as liquid salt particles. Solid particles may be attached to or encapsulated within liquid salt particles. The molten metal containing the suspended particles is moved through a medium of submerged contacting surfaces such as a packed bed. The contacting medium has a high void fraction and a high specific surface area. This results in coalescence or agglomeration of the particles which are thus rendered more responsive to gravity separation than the fine particles. The molten metal preferably is then passed through inclined channels or passages in contact with inclined surfaces such as parallel plates or tubes, the movement therethrough being substantially laminar. Buoyant particles and agglomerates collect on the underside of the inclined surfaces and typically move upwardly in counterflow relationship with metal where the metal moves laterally and downwardly through the inclined passages. A plurality of such inclined surfaces may be provided as tubes or parallel plates. A gas such as a nonreactive gas with or without a chlorinaceous or halogenaceous gas may be bubbled through the contacting medium for further treatment of the molten metal. Such gas can be used to provide a mild disturbance in the contacting medium to aid removal of agglomerated particles, especially buoyant particles, therefrom.

46 Claims, 3 Drawing Figures

REMOVAL OF FINE PARTICLES FROM MOLTEN METAL

BACKGROUND

This invention relates to separating a molten metal such as aluminum or aluminum alloy from suspended fine particles typically comprising a buoyant phase such as a buoyant liquid salt phase and to the use of such in combination with processes for purifying molten aluminum which produce a salt reaction product.

Molten metal such as aluminum, including alloys containing over 50% aluminum, has been treated with salt to remove impurities or with a gas which reacts with certain impurities to produce a salt reaction product, typically liquid salt, or combinations of liquid salt with solids and gases. Processes of this type are described in U.S. Pat. Nos. 3,767,382, 3,849,119 and 3,839,019, all of which are incorporated herein by reference. Each of these processes includes some provision for settling such as separation chambers to separate treated molten aluminum from salt, either added in treating the molten aluminum or formed as a reaction product in treating the molten aluminum. However, as such systems are pressed for increased productivity, difficulties can be encountered in separating the suspended salt-bearing and other particles from the molten aluminum. If the particles are not adequately separated and are carried by the molten aluminum to the casting station, such can result in surface and subsurface defects in the cast ingot.

The particles referred to are in the micron size range, typically from less than 1 micron up to 40 or possibly occasionally 50 microns in size (1 micron=$10^{-4}$ cm). The particles can comprise liquid salt droplets or solid particles such as solid oxide particles or solid salt particles attached or encapsulated in liquid salt. The particles typically are lighter or heavier than the molten metal and would be gravity separable but remain entrained or suspended largely because of the surface effects caused by their small size. Other than for their small size, the buoyant particles would rise to the surface for removal by skimming or similar operations and the heavier particles would settle downwardly out of the molten metal. However, efforts to date to remove the particles directly have not been entirely satisfactory. For instance, movement through a filter bed of the type shown in U.S. Pat. No. 3,039,864 can result in premature plugging of the filter bed or, in some cases, passage of liquid particles to the casting operation. The salt particles typically result in oxide patches on continuously cast ingot which can give rise to problems in rolling the ingot into plate or sheet products.

SUMMARY OF THE INVENTION

In accordance with the invention, molten aluminum or other metal containing suspended finely divided particles typically comprising buoyant liquid such as liquid salt or comprising other salt or suspended phases can be treated to coalesce or agglomerate the suspended particles so that they are more readily separated by gravity from the molten metal. Where the molten metal is aluminum, an agglomerated particle size of over 50 microns, preferably over 60 microns, typically facilitates separation by gravity even where the aluminum is moving provided it is moving relatively quietly. Where the agglomerated particles are buoyant, their buoyancy causes them to rise to the surface for convenient separation by skimming or the like. Where the agglomerated particles tend to sink, they can be retained in a trap or other provision. The molten aluminum or other metal is moved through a medium of submerged contacting surfaces such as a bed of packing, suitably refractory packing such as alumina packing, having a high void fraction and a high specific surface area such as Interloc saddles or Raschig rings. The molten metal moves through the contacting medium at a relatively low velocity, and a gas may be passed upwardly through the medium concurrently or countercurrently with the metal. Coalescence or agglomeration of entrained fine particles occurs within the medium, and the coalesced larger particles are separated from the molten metal by gravity, for instance rising to the surface because of their buoyancy.

Further coalescence and agglomeration of particles or collection thereof may be made to occur by moving the molten metal preferably downwardly and laterally in contact with inclined surfaces, suitably substantially parallel surfaces. Buoyant particles collect on the inclined surfaces and typically travel laterally and upwardly in counterflow relationship to laterally and downwardly flowing molten metal. Coalesced buoyant salt-bearing phase is thus removed from the zone of the inclined surfaces by its buoyancy and rises to the surface of the molten metal for removal by skimming or the like. Heavy agglomerated particles sink and can be removed by a suitable trap or other arrangement.

Accordingly, it is an object of the invention to provide for removal of suspended particles, such as solid particles or molten salt particles or particles containing molten salts, from molten metal such as molten aluminum.

Another object is to remove molten salt phases, with or without associated solids, from molten aluminum or other metal by agglomerating particles of such phases to facilitate and enhance separation from the molten metal by gravity. Another object is to agglomerate fine suspended particles into large particles responsive to gravity separation from the molten metal.

DETAILED DESCRIPTION

Figure 1:
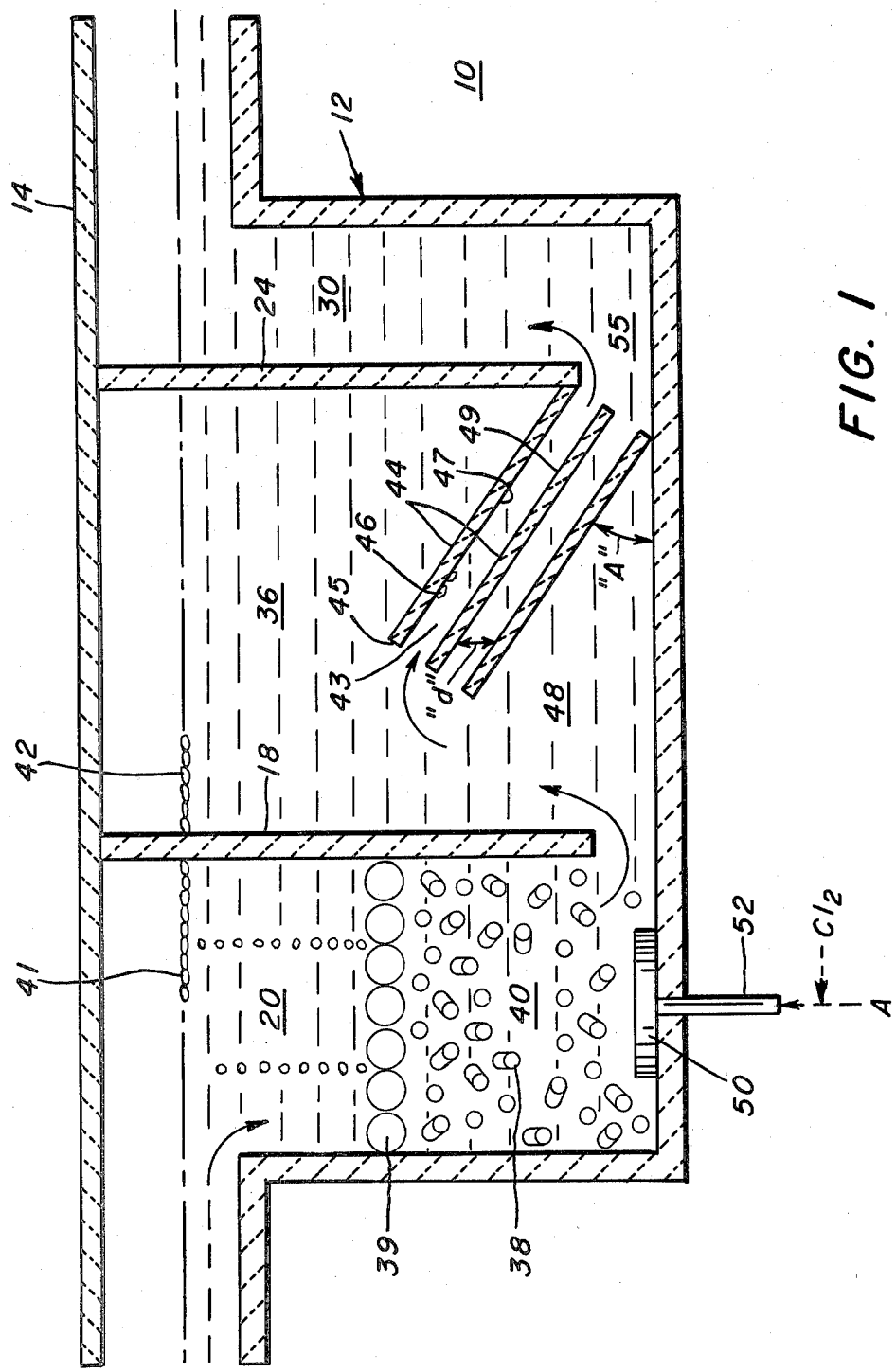

In this description reference is made to the drawings in which:

FIG. 1 is an elevation view in cross section schematically depicting the operation of the improved system and schematically showing one arrangement suitable in practicing the invention.

Figure 2:
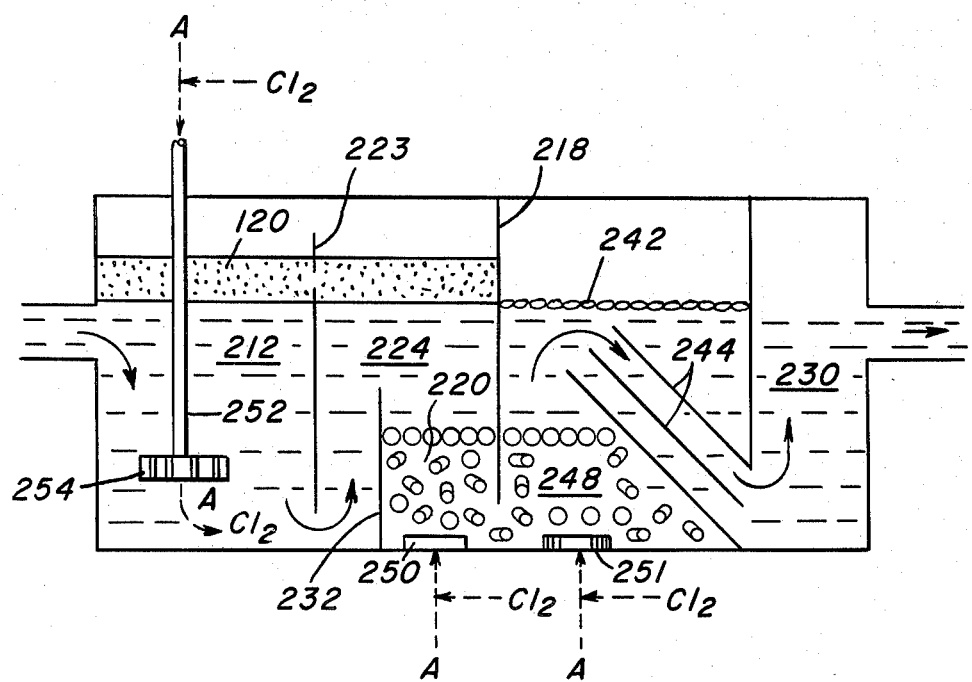

FIG. 2 is a highly schematic elevation illustrating an embodiment of the invention in association with the process shown in U.S. Pat. No. 3,839,019.

Figure 3:
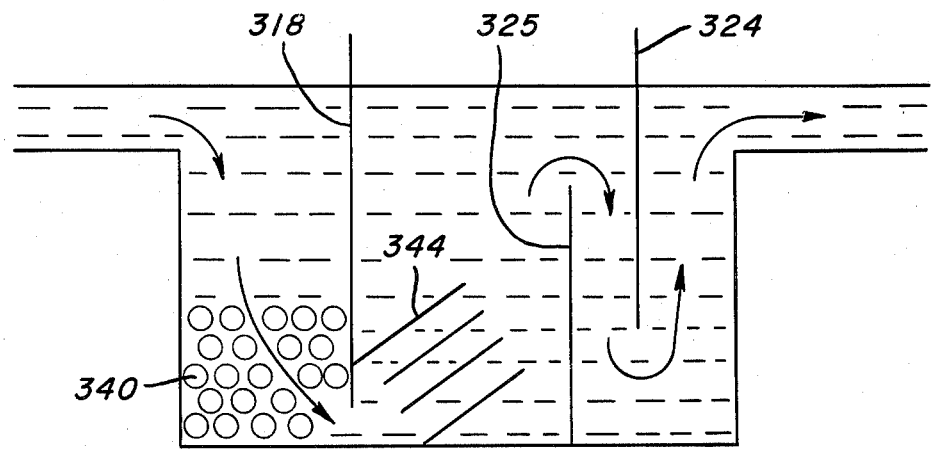

FIG. 3 is a highly schematic elevation illustrating an embodiment of the invention.

Referring now to FIG. 1, the improved system 10 includes a containment vessel 12 constructed or lined with a suitable refractory or a nonreactive material and provided with a lid 14. Inlet baffle 18 establishes inlet leg 20 and outlet baffle 24 establishes outlet leg 30. Within the inlet leg 20 is a zone 40 of submerged contacting surfaces, such as packing, as shown, having a high void fraction and a high specific surface area. Packing 38, like Interloc saddles or Raschig rings, provides suitable contacting surfaces and can be held in position by larger ball members 39. Alternatively, the contacting surfaces can be positioned in zone 48; that is, to the right of baffle 18 as shown in FIG. 1, or packed beds can be positioned on both sides of baffle 18. If the bed is positioned only in zone 48, baffle 18 should be moved to the left in FIG. 1. The submerged contacting surfaces or packed bed provides a first treatment zone 40 according to the embodiment shown in FIG. 1 and may include a gas disperser 50 within or beneath the packing 38 to introduce a gas or gas mixture provided through gas supply line 52. Where packing 38 occupies zone 48 in lieu of or in addition to the bed in leg 20, a gas disperser may be provided for that bed if desired.

A second treatment zone 36 is shown in FIG. 1 between the inlet and outlet baffles 18 and 24. Situated within zone 36 are parallel plates 44 which are inclined downwardly and toward the outlet leg 30. While three plates 44 are shown in FIG. 1, there may be a greater or lesser number as desired or required according to the guidelines herein set forth.

In operation, molten metal containing fine agglomerable particles, typically less than one micron up to 40 or possibly 50 microns, travels down inlet leg 20 and through first zone 40 containing submerged surface contact media such as packing 38. Within zone 40 there occurs a substantial amount of coalescence or agglomeration of the suspended salt or other fine particles into larger particles typically over 50 or 60 microns. Where the suspended fine particles are buoyant, they agglomerate into larger particles within zone 40, many of which particles rise to the surface as a floating phase 41. Some agglomerated buoyant particles may pass under baffle 18 and rise within chamber 36 as a floating phase 42. Where the particles are heavy or tend to sink, they tend to collect beneath zone 48 and can be periodically removed. After passing through the zone 40, preferably the molten metal is moved downwardly and toward the outlet leg 30 passing through channels 43 between parallel plates 44. The metal moves relatively slowly between the plates 44 under substantially laminar flow conditions. As the molten metal travels between the plates 44 in laminar flow fashion, buoyant particles, including particles coalesced in zone 40, collect and coalesce or agglomerate further to form agglomerated phase 46 on the underside surface 47 of the plates 44. The buoyant agglomerated phase 46 moves upwardly and laterally (to the left in FIG. 1) in a direction counterflow to the metal flowing downwardly and laterally between the plates 44. The agglomerated buoyant phase 46 thus passes upwardly along the underside of plates 44 and upwardly off the upper edge 45 of the plates 44 to rise to the surface in the treatment zone 36 and accumulates as floating material 42 in zone 36. Where the particles sink, they collect at site 55 for periodic removal. Thus, the channels 43 between plates 44 provide for collection and further agglomeration of particles, typically agglomerated in zone 40, so as to further improve particle separation from the molten metal.

As shown in FIG. 1, a gas can be introduced into the lower regions of zone 40 and contact media 38 through a gas disperser 50 connected to a gas inlet pipe 52. Where the molten metal is aluminum, suitable gases may be relatively inert gases or nonreactive gases including the so-called inert gases such as helium, neon, argon, krypton and xenon or, on a less preferred basis, carbon monoxide, nitrogen, carbon dioxide or various other gases provided care is taken not to introduce contaminants into the molten aluminum. Argon is a preferred gas for aluminum because of its ready availability and ease of handling. If desired, the inert or nonreactive gas can be combined with a chlorinaceous gas or other halogen containing gas such as halocarbons (e.g. freons) in ratios of about 50 to 99% nonreactive gas and 50 to 1% chlorine or other chlorinaceous or halogenaceous gas. For instance, a mixture of 85 to 99% argon and 15 to 1% chlorine or freon is useful. The use of a chlorinaceous or halogenaceous gas can remove trace impurity elements such as sodium and calcium in the bed 40 as well as oxide and dissolved gas impurities. The gas can also serve to flush the media 40 and facilitate release of agglomerated buoyant particles therefrom to rise toward overlying layer 41. Periodically purging the media by increased amounts of gas flow can release agglomerated particles which may be trapped in the media, and one preferred practice of the invention includes use of a fluxing gas substantially continuously during operation and periodically increasing the gas flow rate to 1½ or 2 to 3 times the normal continuous rate so as to disturb the bed sufficiently to purge trapped agglomerated particles from the media so as to rise to surface phase 41. During this high gas flush rate it is preferred that metal flow through zone 40 be interrupted because the disturbance of the media can interfere with proper cleaning of the molten metal. This is normally easily facilitated by scheduling media purges during down time such as for casting mold replacement or adjustment. By interrupting metal flow through zone 40 is meant that the overall flow is interrupted but allowing for some minor metal movement within zone 40 such as in response to the high flow gas purge. If the associated casting operation is completely continuous and not amenable to interruption, the ingot cast from the metal passing through zone 40 during purging might contain impurities which alter its quality. Suitable steady state or continuous gas flow rates range from about 0.005 to 0.4 or 0.5 standard cubic feet per hour (SCFH) per square inch of contact media cross section in the plane normal to gas flow (horizontal plane in the Figures). Preferred gas rates are 0.015 to 0.2 SCFH per square inch. For the high rate purge the gas rate can be about 0.008 or 0.009 to 0.6 or 0.7 or more SCFH per square inch, suitably about 0.025 to 0.35 SCFH per square inch. The purge should be aggressive enough to dislodge particles in the media and should be greater than the steady state rate which typically is selected to not disturb the media or dislodge particles. For treating molten aluminum in ½-inch diameter by ½-inch long pipe-like rings, a continuous gas rate of about 0.05 SCFH per square inch and a purge rate of 0.2 SCFH per square inch are suitable. Particularly during purge operation large heavy balls 39, such as ¾-inch or one-inch refractory balls, help prevent excessive disturbance to the media 38.

Suitable submerged contacting surfaces 38 for zone 40 can be provided by Raschig rings, Interloc saddles or other packing or other means having the requisites herein set forth. A first requisite for the submerged contacting surface media is that such have a relatively high void fraction, meaning fraction of total volume which is not occupied by solid material such as the packing or submerged bodies and available for molten metal movement through the contact surface zone 40. The minimum value for the void fraction in accordance with the invention should be about 0.4 or about one-half, suitably about 0.6. A preferred void fraction is about 0.7 or 0.8 or more. A void fraction of 0.6 is almost twice that of a filter bed made up of ¾-inch diameter alumina balls or a filter bed made up of fine mesh alumina particles, such as −4+6 mesh (U.S. Pat. Nos.

3,737,305 and 3,039,864), each of whose void fraction is about 0.33. The high void fraction in accordance with the invention facilitates attachment of fine salt and other particles to the contact surfaces for agglomeration and removal of the agglomerated particles.

A second requisite for the contact media 38 is that it have a high specific surface area (area per unit volume) which provides surfaces for the desired agglomeration or coalescence to occur. In accordance with the invention, the surface area desired for the contact media is a minimum specific surface area of at least 25 square feet per cubic foot, with specific area of 50 or 75 square feet per cubic foot being suitable and with specific areas over 80 being preferred. Specific contact media areas of around 90 square feet per cubic foot or more appear to provide superior results. Provided such can be accompanied by adequate void fraction, a specific area of 120 square feet per cubic foot is highly preferred. The following Table 1 sets forth suitable packing materials (Interloc saddles and Raschig rings) in accordance with the invention along with comparison values for other materials such as those set forth in U.S. Pat. Nos. 3,737,305 and 3,039,864.

TABLE 1

| Packing | Average Bed Void Fraction | Average Specific Surface Area (ft$^2$/ft$^3$) |
|---|---|---|
| ½″ Interloc saddles | 0.78 | 190 |
| ½″ × ½″ Raschig rings | 0.85 | 93 |
| ¾″ diameter balls | 0.33 | 54 |
| −6 + 14 mesh particles | 0.33 | 257 |

It can be seen in the foregoing Table 1 that ¾-inch diameter balls or fine mesh particles such as those depicted in U.S. Pat. No. 3,737,305 are not used in practicing the invention. Contacting beds made from such can be plugged when situated after a process such as shown in U.S. Pat. No. 3,839,019. The more open type bed provided by saddles or rings does serve the purpose of the invention and rings may be provided by cutting pipe-like or hollow cylindrical shapes into relatively short segments.

The material selected for the contact media 38 should not contaminate the molten metal and should have a long service life in exposure to molten metal without melting or deteriorating to interfere with the improved process or desired results. Where the molten metal is aluminum, typical temperatures are 1250° to 1500° F., and the media 38 should be able to withstand such. Suitable refractory materials for use with aluminum having a higher melting point than aluminum and being substantially inert toward aluminum include such substances as chromite, corundum, forsterite, magnesia spinel, periclase, silicon carbide and zircon. Alumina (synthetic corundum) is a preferred noncontaminating material for molten aluminum. Carbonaceous materials such as fashioned from used carbon anodes can also be useful with molten aluminum although such tend to float in molten aluminum and some provision such as a refractory screen should be provided above zone 40 to prevent the carbonaceous material from floating out of the zone. Hence, the term "noncontaminating" is intended to include both refractory materials and even carbonaceous or other materials which may not be considered completely refractory to aluminum in the strict sense of the term "refractory" but are sufficiently stable that they do not introduce unwanted contaminants into the molten metal.

The depth of the contacting media 38 in zone 40 should be at least 6 inches and preferably 10 or 15 inches or more. A bed of rings or saddles around 20 inches deep is suitable. This provides desired time for contact between the molten metal and the contact media surfaces to encourage coalescence or agglomeration of suspended particles.

In zone 40 it is desired to move the molten metal over large surface areas at a relatively slow velocity so as to facilitate the desired agglomeration of salt and other fine particles. The superficial molten metal velocity (velocity based on no media or packing 38) through this zone 40 is suitably less than 5 feet per minute. A slower superficial velocity of less than 3 feet per minute is better and less than 1 or 2 feet per minute is preferred. For molten aluminum, a velocity of one foot per minute corresponds to 60 pounds per hour per square inch of cross section in zone 40 measured in a horizontal plane (normal to mean metal path). Molten metal retention time in zone 40 should be ¼ or ½ minute or more with times of ¾ minute or more being preferred.

One preferred practice is to employ sufficient metal velocity through the contact media to flush agglomerated particles from zone 40 with molten metal movement. A superficial velocity of about ½ foot per minute or more, for instance 0.55 or 0.6 or 0.65 foot per minute or more, is preferred. This can hinder agglomerated particles from accumulating in zone 40 to the extent that molten metal movement is resisted. This preferred embodiment results in the molten metal exiting the contacting surface zone carrying with it substantial amounts (or even major portions or the majority, for instance 60% or more) of particles agglomerated in zone 40. However, the fact that the larger agglomerated particles resulting from the improvement are separable by gravity, even from moving molten metal, enables ready removal of the particles and, hence, such molten metal desirably is passed through a gravity separation zone after exiting the contact media. Such a zone is preferably provided by inclined plates 44 which are highly efficient to remove agglomerated particles carried out of the contact surface media by the molten metal. While some of the particles, e.g. oxides, have a chemical makeup suggesting a density above that of the molten metal, such as aluminum, the open porous structure of the agglomerated particles often gives them a low bulk density which causes gravity separation by upward (or buoyant) movement of the particles from the metal. This facilitates ready removal from floating phase 42 wherein oxides, salts and other phases are kept floating on top of the molten metal by the surface tension (interfacial tension) of the molten metal thus effectively trapping such for ready removal. This preferred practice greatly extends the life of the surface contact media. Further, it can combine with the preferred practice of periodically purging or flush disturbing the media by high gas flow rates to virtually eliminate need for contact media replacement. This advantage is available because of the high void fraction and specific surface area for the media in accordance with the invention. As an illustration of the impovement in useful contact media life, the system according to U.S. Pat. No. 3,737,305 was situated after the system according to U.S. Pat. No. 3,839,019 and was successful in enhancing the molten aluminum leaving the system of U.S. Pat. No. 3,839,019 and exhibited good filter bed life. Replacing the system of U.S. Pat. No. 3,737,305 with the present improvement using Raschig rings resulted in running five times longer and, capability-wise, even more since the operation was interrupted for reasons having no relation to bed life.

The inclined plates 44 shown in FIG. 1 may be provided in any suitable number and in various configurations suitable in practicing the invention. The plates should be fashioned from a material which is not attacked by nor introduces contaminants into the molten metal. For treating molten aluminum suitable plate materials are graphite, silicon carbide, carbon, alumina or other materials which don't contaminate molten aluminum. The plates are shown as flat, but they can be corrugated in either direction, especially the direction normal to the plane of FIG. 1. Also, instead of plates, the inclined surfaces may be provided by simply stacking an array of pipes in the general configuration shown in FIG. 1. This would provide flow paths within the inside diameter of a round pipe and in the spaces between adjacent pipes (diamond-shaped or triangular-shaped depending on the stacking relationship of the pipes). Pipes could be of square, rectangular or polygonal section. The number of plates, or the number of spaces or channels between the plates, is a function of the desired overall flow rate through the system while providing a laminar flow condition between the opposed surfaces 47 and 49. The flow should be laminar without substantial turbulence or flow separation from the surfaces 47 and 49. The Reynolds number should not exceed 3500 and preferably is not in excess of 2800. Flow rates of 3 or 4 feet/minute or less through the channels between the plate members 44 are suitable with flow rates of less than 2 feet/minute being preferred.

The distance between the plates or between opposed surfaces 47 and 49 can vary somewhat in the practice of the invention. The plates should not be so close as to be readily clogged by the agglomerated materials nor should the spaces between plates present such a small flow path as to impede the flow of molten metal therethrough. As just stated, the metal flow rate moving through the spaces between the plates 44 should be quiet and laminar. A distance between opposed surfaces 47 and 49 of about ½ or 1 to 2 inches is suitable in practicing the invention, although distances of up to 10 inches or even more can be useful. The angle A for the plates can also vary in accordance with the invention. The plates preferably should not be horizontal since such would impede the desired separating action which occurs between the plates (separating upwardly or downwardly depending on weight relative to the molten metal) and would impede the desired removal of agglomerated material from between the plates. In a broad sense, the invention includes angles of about 5° to 90° relative to the horizontal. However, an angle of 90° has some disadvantage as reducing the amount of particle removal and the angle is suitably less than 90°. An angle of about 10° or 15° to 70° or 80° is more suitable with angles of about 25° to 50° being preferred. Angle A of 20° or 30° to 45° is very suitable in practicing the invention, especially with a spacing of about ½ or 1 to 2 inches between plates or inclined surfaces in treating molten aluminum.

The length of the channels in the direction of metal flow should be such as to provide sufficient time to achieve the desired separation and agglomeration of particles to facilitate floating of the lighter particles and sinking of those heavier than the molten metal. Preferably, the ratio of the channel length to the vertical distance "d" between plates is at least 5:1, preferably 8 or 10:1, although a smaller ratio can also be useful in certain applications. Plates 44 may be substituted with hollow pipes or tubes or any other convenient method for providing inclined surfaces 47 and 49 defining a channel or flow path for downward and lateral movement of the molten metal in contact with such surfaces which serve as surface sites for the desired collection and agglomeration or coalescence of the suspended particles. While generally parallel plate or pipe surfaces are convenient for such purpose, the invention is not necessarily intended to be limited to this specific approach. What is important is that a downward, preferably laterally downward, flow path or channel be provided for molten metal to travel in contact with a surface at least partially defining such flow path. Preferably, upper and lower inclined surfaces define the upper and lower boundaries of an inclined molten metal flow path or channel. These surfaces are advantageously straight and smooth for simplicity of construction and to more readily facilitate laminar flow conditions and prevention of clogging. However, the surfaces 47 and 49 may be curved, corrugated, roughened or otherwise depart from the straightforward arrangement of FIG. 1. Further, while substantially parallel surfaces 47 and 49 are preferred, such is intended in the broad sense. For instance, roughened or corrugated surfaces are taken to roughly describe a single or "average" plane and some amount of divergence or convergence such as not substantially greater than 10° or 15° is herein taken to be substantially parallel.

The improved process is highly suited to the treatment of molten aluminum and has demonstrated a marked ability to remove finely divided particles, especially finely divided particles comprising salt phases, particularly salt phases which are liquid or which are less dense than aluminum. While such salt phases tend to float in molten aluminum if possessed of sufficient size, they remain entrained in the aluminum where the particles are of the micron size and hence their agglomeration or coalescence in accordance with the improvement facilitates ready removal since the buoyant particles ultimately gather on the surface of the metal as a floating salt phase easily removed. The improvement is especially applicable to alloys of aluminum containing substantial amounts of magnesium, which alloys have been subjected to chloridizing or halogenizing treatments directed to the removal of trace elements such as sodium and calcium such as according to one embodiment of the process described in U.S. Pat. No. 3,839,019, incorporated herein by reference. According to one embodiment of that process, molten aluminum or alloys thereof are contacted with a gas comprising a chlorinaceous gas such as a mixture of argon and chlorine (90% A–10% $Cl_2$) to degas the aluminum, remove trace elements such as sodium and calcium and remove oxide impurity particles. However, where the aluminum alloy has a substantial magnesium content such as an Mg content above 2 or 3%, for instance an alloy containing 3½ to 6% Mg, some small amount of liquid $MgCl_2$ is included with the otherwise solid $CaCl_2$ and NaCl formed by chloridizing the trace elements Na and Ca. The salt particles and other particles, because of the liquid $MgCl_2$, generally exhibit a liquid or semi-liquid character and would be buoyant if coalesced into larger sizes. However, as the treated metal exits the process according to U.S. Pat. No. 3,839,019, some of these particles sometimes can remain entrained especially where the process is pressed to increase productivity by processing increased amounts of aluminum per hour and where more and more aluminum derives from contaminated scrap. In treating alloys of aluminum containing Mg, especially alloys containing 4% or more Mg, such dispersed phase can present problems in separation which can carry through into the eventual cast product. Situating a unit of the type depicted in U.S. Pat. No. 3,737,305, incorporated herein by reference, after the process according to U.S. Pat. No. 3,839,019 improves the overall operation quite substantially but sometimes the micron sized particles can shorten the bed life of the filter bed shown in U.S. Pat. No. 3,737,305 and interfere with the bed life improvement otherwise associated with that process.

Hence, one especially useful embodiment of the improvement arises in combination with a process of the type in U.S. Pat. No. 3,839,019 wherein molten aluminum, especially molten aluminum containing magnesium, is purified by chloridizing within a chloridization chamber so as to react chlorine or chlorides or other halides with metallic impurities, typically Na and Ca or even Mg, in the aluminum and produce the chloride or halide salts of those impurities, and wherein the chloridization is effected within an agitated region such as region agitated by a rotating device such as a turbine blade about 12 inches in outside diameter with 2-inch square paddles and rotating at about 150 to 400 rpm. Such processes are useful in treating molten aluminum with a gas comprising a chlorinaceous gas such as a gas comprising about 90% or more argon or other nonreactive gas and 10% or a little less of chlorine. The improved process can produce significant improvements in the overall quality of the metal exiting such a treatment, and one suitable arrangement for combining the improvement with said process is depicted in FIG. 2 which is a highly schematic "stick" diagram.

In FIG. 2 molten aluminum is treated in chamber 212 by introducing a mixture of argon and chlorine and passing it down within a hollow conduit (not shown) provided within rotating shaft 252 and including at the lower end thereof a rotating blade 254. Chloridization in this fashion will react sodium, calcium strontium, lithium and magnesium to form their respective chloride salts which, in large part, collect in overlying salt layer 120. For increased treatment, two or more such chloridization zones may be situated in parallel or series flow relationship. After exiting the chloridization chamber 212, the molten aluminum passes under baffle 223 and into a salt separation chamber 224 where it undergoes a direction change by the action of baffle 232. The metal then is moved downwardly through submerged contacting surfaces such as bed 220 in accordance with the first treatment according to the invention wherein the molten aluminum is contacted with a gas comprising argon and chlorine introduced through disperser 250. The bed 220 includes packing in accordance with the hereinabove set forth guidelines. The molten aluminum passes beneath baffle 218 and moves upwardly through zone 248 which may likewise be provided with packing or other submerged contacting surfaces in accordance with the invention and the molten metal can be contacted with gas introduced through disperser 251. Fine salt particles passing downwardly through filter bed 220 are agglomerated into larger particles, some of which rise upwardly from the bed to join the overlying salt layer 120. This is enhanced by the fact that the particles exiting separation zone 224 entrained in the molten aluminum are buoyant except for their extremely fine size such that when agglomerated they tend to rise upwardly into overlying salt layer 120. This effect can be enhanced some by action of gas, introduced through disperser 250, as the gas moves upwardly through the bed 220. The molten aluminum passing beneath baffle 218 may be treated further by including a packed bed within zone 248 or simply allowed to rise upwardly to enter the upper extremities of the paths between inclined plates 244. If no packing is present in 248, some agglomerated particles passing under baffle 218 will simply rise upwardly into salt layer 242. If a bed is present in zone 248, further agglomeration will occur and the buoyancy of the agglomerated particles will carry some particles newly agglomerated as well as some agglomerated particles exiting bed 220 upwardly into the overlying salt layer 242. Next the molten aluminum is passed downwardly and laterally through the spaces between plates 244 wherein further agglomeration of the salt and other particles and collection of agglomerated particles leaving bed 220 occur. As already made clear, the flow through the spaces between plates 244 should be relatively slow and laminar. The molten aluminum is then passed upwardly through exit chamber 230 and out to the next operation, typically a casting operation.

The present improvement is also useful in combination with processes wherein aluminum is treated with salts with or without simultaneous gas treatment for oxide, gas or impurity metal removal, particularly where such a process involves vigorous agitation such as in U.S. Pat. Nos. 3,767,382 and 3,849,119. Hence, the improvement is considered highly useful in combination with processes for treating molten aluminum with halogen or chlorine active agents wherein salt reaction products are formed which are advantageously separated from the aluminum prior to casting.

While the downwardly inclined plates 44 in FIG. 1 are often preferred, other arrangements can also be employed. For instance, referring to FIG. 3, which is a highly schematic "stick" diagram, the plates 344 are shown inclined upwardly in the direction of molten metal travel. Thus, molten metal enters the system and passes downwardly through bed 340 where it may contact a gas, not shown. After passing beneath baffle 318, the metal moves upwardly and toward the right in FIG. 3 between parallel plates 344. It then passes over baffle 325 and under baffle 324 and exits the system. Particles are separated between the plate 344 in a manner similar to that with the FIG. 1 arrangement except that buoyant particles are moved concurrent with the metal flow between plates 344.

EXAMPLE

Thin sheet of aluminum alloy 5182 containing 4 to 5% magnesium, along with 0.2 to 0.5% Mn, is widely used in tear-open beverage can ends. It is produced by casting a relatively large ingot which is homogenized and hot rolled into thick sheet followed by cold rolling into thin sheet. When alloy 5182 is treated prior to casting by the process of U.S. Pat. No. 3,839,019 to remove sodium and calcium,, some of the magnesium present is converted to $MgCl_2$ in the form of very minute buoyant liquid particles. These particles can present some difficulty in removal. If substantial amounts of such particles are carried with the metal to the casting operation, the resulting cast ingot can exhibit surface patches of oxides of magnesium and aluminum. These oxide patches result in edge cracking during the subsequent rolling operations which can be so excessive as to impede rolling or even to render the ingot unacceptable. The presence of such oxide patches in serious amounts can prevent rolling as requiring removal of so much edge metal as to be uneconomical.

In a series of runs, alloy 5182 was treated according to the process of U.S. Pat. No. 3,839,019 and ingots thereof were cast. In further runs, the same procedure was employed except that the process of U.S. Pat. No. 3,839,019 was followed by the improved process as depicted in FIG. 1, including the use of a chlorine-argon gas mixture introduced into zone 40. The improved system included a bed 38 of Raschig rings ½ inch outside diameter, ⅜ inch inside diameter and ½ inch long, the bed being about 13 inches deep in main flow path (bottom of baffle 18 to top of bed). Five inclined channels were provided between parallel surfaces in zone 36. The results are shown in Table 2 below.

TABLE 2

|  | Na | | Ca | | Oxide |
|---|---|---|---|---|---|
|  | Before | After | Before | After | Patches |
| U.S. Pat. No. 3,839,019 Only | .004 | .0003 | .003 | .0004 | Serious oxide patches |
| U.S. Pat. No. 3,839,019 plus improvement | .004 | .0000 | .003 | .0002 | No oxide patches |

It can be seen that the present improvement eliminates the ingot oxide patches completely but, further, facilitates still more removal of Na and Ca than the process of U.S. Pat. Nos. 3,839,019 alone, it being noted that said U.S. Pat. No. 3,839,019 process has enjoyed considerable commercial use because of its recognized benefits. Yet, the use of said process is greatly enhanced by the present improvement which not only greatly improves removal of Na and Ca but completely eliminates salt-derived oxide patches from ingot surfaces sometimes encountered with aluminum alloys containing substantial amounts of magnesium.

Tests on molten aluminum have further verified the effectiveness of the present improvement, especially in removing salt containing impurities. Melt samples were taken at points corresponding in FIG. 1 to the inlet portion 20 (before treatment), zone 48 (intermediate) and outlet bay 30 (after treatment). The samples were solidified in graphite sample containers which were sectioned for examination at 50× magnification. Salt impurities absorb moisture so rapidly when exposed to the atmosphere that as the metal solidifies the salt and moisture form an enlarged spherical "globule". Such spherical globules provide both qualitative and quantitative indiction as to salt impurities present. Examination of the sample for the inlet (untreated) metal revealed a plurality of spherical globules, several spheres of different sizes being visible. Examination of aluminum from zone 48 exhibited greatly reduced frequency (less than half) and significantly reduced size of globules. Examination of the aluminum in outlet bay 30 indicates no globules present, thus further verifying the effectiveness of the improved system.

While the foregoing description has emphasized the improvement as applied to treating molten aluminum, such is not necessarily intended to limit the scope of the improvement herein described which applies to the light metal magnesium and to other metals. While considerable emphasis has been placed on buoyant salt-bearing particles, the invention has demonstrated the capability of removing nonbuoyant particles such as titanium diboride ($TiB_2$) particles and aluminum and other oxide impurity particles.

While the invention has been described in terms of preferred embodiments, the claims appended hereto are intended to encompass other embodiments which fall within the spirit of the invention.

What is claimed is:

1. A method of treating molten metal containing agglomerable suspended particles of material substantially different in density than said metal but buoyantly suspended in said metal because of their fine size comprising:
   (a) passing said metal containing said fine particles through a medium of submerged contacting surfaces selected to avoid introduction of unwanted contaminants into said metal, said medium having a high average void fraction and a high specific surface area so as to agglomerate portions of said particles to form agglomerated particles of larger size separable by gravity from said molten metal;
   (b) carrying agglomerated particles out of said media by sufficient molten metal velocity; and
   (c) moving said molten metal containing agglomerated particles through a gravity separation zone including means to separate said agglomerted particles from said molten metal by gravity.

2. The method according to claim 1 wherein said medium of submerged noncontaminating contacting surfaces has an average void fraction of at least 0.5 and a specific surface area of at least 25 square feet per cubic foot.

3. The method according to claim 2 wherein said void fraction is 0.7 or more.

4. The method according to claim 2 wherein said specific surface area is 75 square feet or more.

5. The method according to claim 1 wherein the movement of said molten metal within said gravity separation includes substantially laminar flow movement.

6. The method according to claim 1 wherein the average superficial velocity of said molten metal moving through said medium of submerged noncontaminating surfaces is greater than one-half foot per minute.

7. The method according to claim 1 wherein the average superficial velocity of said molten metal moving through said medium of submerged noncontaminating surfaces is from one-half to three feet per minute.

8. The method according to claim 6 wherein said superficial velocity is 0.6 foot per minute or more.

9. The method according to claim 1 wherein in said step (b) said molten metal is moved through at least one inclined channel bounded by at least one inclined surface, said movement through said channel being laminar in flow to remove said agglomerated particles by gravity from said moving molten metal to said inclined surface.

10. The method according to claim 9 wherein a plurality of inclined channels provide pluralities of said inclined surfaces.

11. The method according to claim 9 wherein a plurality of inclined channels are provided between substantially parallel surfaces.

12. The method according to claim 9 wherein a plurality of inclined channels are provided between substantially flat parallel surfaces.

13. The method according to claim 12 wherein said surfaces are approximately one-half to two inches apart.

14. The method according to claim 9 wherein a plurality of channels are provided by a plurality of inclined substantially parallel planes.

15. The method according to claim 9 wherein a plurality of channels are provided by a plurality of inclined substantially parallel tubes.

16. The method according to claim 11 wherein said surfaces are inclined at an angle between 10° and 70° from the horizontal.

17. The method according to claim 11 wherein said surfaces are one-half to two inches apart and are inclined at an angle between 20° and 45° from the horizontal.

18. The method according to claim 9 wherein said metal moves downwardly and laterally through a plurality of inclined channels and agglomerated particles collect on the upper surfaces bounding said channels and move upwardly and rise off the upper portions of said upper surfaces.

19. The method according to claim 1 wherein said molten metal is molten aluminum containing suspended particles in the range of one to 50 microns which are agglomerated in said media in said step (a) into particles above 50 microns which are separable by gravity from moving molten aluminum.

20. The method according to claim 9 wherein molten metal movement through said inclined channel is characterized by a Reynolds number not exceeding 3500.

21. The method according to claim 9 wherein molten metal movement through said inclined channel is characterized by a Reynolds number not exceeding 2800 and by substantial freedom from turbulence or flow separation from said inclined surface.

22. The method according to claim 1 wherein said molten metal is a light metal selected from aluminum and magnesium.

23. The method according to claim 1 wherein said molten metal is aluminum.

24. The method according to claim 1 wherein said particles comprise buoyant halide salt.

25. The method according to claim 1 wherein said particles comprise liquid buoyant halide salt.

26. The method according to claim 1 wherein a gas is introduced into said medium of noncontaminating contacting surfaces.

27. The method according to claim 26 wherein said gas comprises a nonreactive gas.

28. The method according to claim 26 wherein said gas comprises a halogenaceous gas.

29. The method according to claim 26 wherein said gas comprises a mixture of a nonreactive gas and a halogenaceous gas present in amounts less than said nonreactive gas.

30. The method according to claim 1 wherein a gas is introduced into the medium of submerged noncontaminating contacting surfaces at a first gas flow rate and wherein said gas flow rate is periodically increased to purge and dislodge agglomerated particles from said media and cause said agglomerated particles to rise from said media to form a phase substantially floating upon said molten metal.

31. The method according to claim 30 wherein said increased gas flow rate is at least two times said first gas flow rate.

32. The method according to claim 30 wherein molten metal movement through said submerged contacting surface media is interrupted during said period of increased gas flow rate.

33. The method according to claim 1 wherein said molten metal is passed in downward course through said medium of noncontaminating contacting surfaces.

34. The method according to claim 1 wherein the average retention time of said molten metal in said medium of submerged contacting surfaces is three-fourths minute or longer.

35. The method according to claim 1 wherein said molten metal is moved downwardly through a first medium of said submerged noncontaminating surfaces and then upwardly through a second medium of said submerged noncontaminating surfaces.

36. The method according to claim 35 wherein said metal moves countercurrent to rising gas in said first medium and moves concurrent with rising gas in said second medium.

37. The method according to claim 1 wherein said surfaces in said medium are refractory.

38. The method according to claim 2 wherein said submerged noncontaminating surfaces in said medium comprise ring-shaped bodies.

39. The method according to claim 2 wherein said submerged noncontaminating surfaces in said medium comprise saddle-shaped bodies.

40. The method according to claim 1 wherein said particles are less dense than said molten metal.

41. A method of treating molten metal containing agglomerable fine gravity suspended particles to agglomerable said particles to a size separable by gravity from said molten metal and facilitate removal of said particles from said molten metal comprising:
 (a) passing said metal containing said particles through a medium of submerged contacting surfaces selected to avoid introduction of unwanted contaminants into said metal, said medium having an average void fraction of at least 0.5 and a specific surface area of at least 50 square feet per cubic foot to agglomerate portions of said particles and render them separable by gravity from said molten metal;
 (b) thereafter moving said metal containing agglomerated particles through at least one inclined channel bounded by upper and lower inclined surfaces, said movement through said channel being laminar in flow to separate agglomerated particles from said molten metal by gravity movement to one or more of said inclined surfaces.

42. The method according to claim 41 wherein said metal is passed through said medium at a superficial velocity of from one-half to five feet per minute to carry agglomerated particles from said medium to said inclined channel.

43. The method according to claim 42 wherein said superficial velocity is 0.6 to 2 feet per minute.

44. The method according to claim 42 wherein particles retained in said medium are periodically purged therefrom by passing gas through said medium at a sufficient rate to disturb said medium and dislodge particles therefrom.

45. A method of treating molten light metal containing suspended fine particles to agglomerate and remove said particles by gravity from said molten aluminum comprising:

(a) passing said molten metal through a medium of submerged contacting surfaces selected to avoid introduction of unwanted contaminants into said metal, said medium having an average void fraction of 0.5 or more and a specific surface area of 50 ft.$^2$/ft.$^3$ or more thereby to agglomerate said particles to a size gravity separable from said molten metal;

(b) contacting a gas with said molten metal;

(c) moving said molten metal containing agglomerated particles through a plurality of inclined channels bounded by substantially parallel upper and lower surfaces, said surfaces being inclined at an angle of from 10° to 70° with the horizontal, said movement of molten metal through said channels having a substantially laminar flow condition characterized by a Reynolds number less than 2800 to separate said particles by gravity from said moving molten metal and collect said particles on surfaces defining the upper boundaries of said channels, said particles moving along said upper surfaces and rising off the portions of said upper surfaces to form a layer floating upon said molten metal.

46. A method of treating molten aluminum comprising mixing molten aluminum with a halogen active substance to produce suspended fine particles comprising fluid halide salts suspended in said molten aluminum and including particle sizes of 1 to 50 microns, said method further comprising:

(a) moving said molten aluminum containing said fine particles through a medium of submerged contacting surfaces selected to avoid introduction of unwanted contaminants into said metal, said medium having an average void fraction of 0.5 or more and a specific surface area of 50 ft.$^2$/ft.$^3$ or more thereby to agglomerate said particles to a size above 50 microns and separable from said molten aluminum by gravity;

(b) contacting said molten aluminum moving through said medium with a mixture of halogenaceous and a nonreactive gas, said gas mixture being provided at a first flow rate;

(c) moving said molten aluminum through a plurality of downwardly inclined channels bounded by substantially parallel upper and lower surfaces, said surfaces being inclined at an angle of from 10° to 70° with the horizontal, said movement of molten aluminum through said channels being substantially laminar and characterized by a Reynolds number less than 2800 to separate said particles by gravity from said molten aluminum and collect said particles on the upper boundary surfaces of said channels, said particles moving along said upper boundary surfaces and rising off the end portions of said surfaces to form a layer floating upon said molten aluminum;

(d) periodically flushing said medium with said gas by increasing said gas flow to a rate substantially greater than said first gas flow rate so as to remove agglomerated particles from said medium and lengthen the useful life of said medium in treating molten aluminum.

* * * * *